US006073063A

United States Patent [19]

Leong Ong et al.

[11] Patent Number: 6,073,063

[45] Date of Patent: Jun. 6, 2000

[54] AUTOMOTIVE DATA RECORDING DEVICE

[75] Inventors: Kay (Dexter) Leong Ong, Belleville; Bruce David Bryant, Royal Oak, both of Mich.

[73] Assignee: Ford Global Technologies, Inc., Dearborn, Mich.

[21] Appl. No.: 08/794,392

[22] Filed: Feb. 6, 1997

[51] Int. Cl.[7] .............................. G06F 9/24; G05B 19/42

[52] U.S. Cl. ................................ 701/35; 701/29; 701/30; 701/33

[58] Field of Search ................................ 701/35, 29, 30, 701/33

[56] References Cited

U.S. PATENT DOCUMENTS

| | | | |
|---|---|---|---|
| 4,602,127 | 7/1986 | Neely et al. | 179/2 |
| 5,311,430 | 5/1994 | Ishigami | 364/424.04 |
| 5,524,078 | 6/1996 | Kolb et al. | 364/424.03 |
| 5,541,840 | 7/1996 | Gurne et al. | 364/424.03 |
| 5,802,485 | 9/1998 | Kolle et al. | 701/35 |
| 5,948,026 | 9/1999 | Beemer, II et al. | 701/35 |

*Primary Examiner*—William A. Cuchlinski, Jr.
*Assistant Examiner*—Olga Hernandez
*Attorney, Agent, or Firm*—Mark L Mollon; Roger L. May

[57] ABSTRACT

An automotive data recording device for collecting data from a vehicle and for storing the data for further analysis includes a first electrical interface adapted to interface with a vehicle data terminal capable of supplying raw data internally monitored by a vehicle computer having a memory for storing the raw data. A volatile memory temporarily stores substantially all the raw data stored in the vehicle computer's memory, and a non-volatile memory stores a desired portion of the raw data. The device also includes a microprocessor programmed to provide a first control signal to retrieve the desired portion of the raw data from the volatile memory for storage in the non-volatile memory and to provide a second control signal to retrieve the desired portion of the raw data from the non-volatile memory.

14 Claims, 1 Drawing Sheet

AUTOMOTIVE DATA RECORDING DEVICE

TECHNICAL FIELD

This invention relates to automotive data recorder devices which collect and record information from an engine computer and other vehicle subsystems over a long period of time.

BACKGROUND ART

Automotive data recording devices exist which collect and record information from an engine computer. One known device is disclosed in U.S. Pat. No. 190 5,541,840 issued to Gurne, et al. The device disclosed in Gurne, et al is a hand-held device that has many functions, one of them being a data logger. As a data logger, the device monitors pre-determined variables and stores them in an internal memory. Since the device's memory is limited, the logged data is stored in memory using a shift register concept. That is, as new data is logged, older data is over-written. Therefore, in the device's memory, the logging information stored represents a snapshot, or a window, of information. Thus, only a limited amount of data can be recorded.

A second known device is disclosed in U.S. Pat. No. 190 4,602,127 issued to Neely, et al. The device in Neely, et al hooks up to an on-board computer and monitors pre-determined variables. The data is then read serially into memory, such as a magnetic tape. The data stored on the magnetic tape can then be used for diagnostic purposes at a remote station. Because a magnetic tape storage mechanism is used, data collection is slow and limited.

Since most driving conditions cannot be reproduced in a garage environment, it is desirable to record vehicle operation data while driving. Since some problems are intermittent, it is often desirable to record data over a long period of time. Furthermore, since it may be difficult to determine the root cause of a problem, it is desirable to record a wide variety of vehicle data. Such data would be helpful in diagnosing vehicle problems, performing vehicle research, and many other functions. Thus, there exists a need for a portable data-recording device capable of collecting a large amount of data and storing the data for subsequent processing.

DISCLOSURE OF THE INVENTION

It is thus a general object of the present invention to provide a portable data recorder device which is capable of collecting and storing large amounts of data.

In carrying out the above objects and other objects, features, and advantages of the present invention, an automotive data recording device is provided. The device includes a first electrical interface adapted to interface with a vehicle data terminal capable of supplying raw data internally monitored by a vehicle computer having a memory for storing the raw data. The device also includes a volatile memory for temporarily storing substantially all of the raw data stored in the vehicle computer memory. The device further includes a non-volatile memory for storing a desired portion of the raw data. Finally, the device includes a microprocessor programmed to provide a first control signal to retrieve the desired portion of the raw data from the volatile memory for storage in the non-volatile memory and to provide a second control signal to retrieve the desired portion of the raw data from the non-volatile memory.

The above objects and other objects, features and advantages of the present invention are readily apparent from the following detailed description of the best mode for carrying out the invention when taken in connection with the accompanying drawings.

BEST MODE FOR CARRYING OUT THE INVENTION

Figure 1:
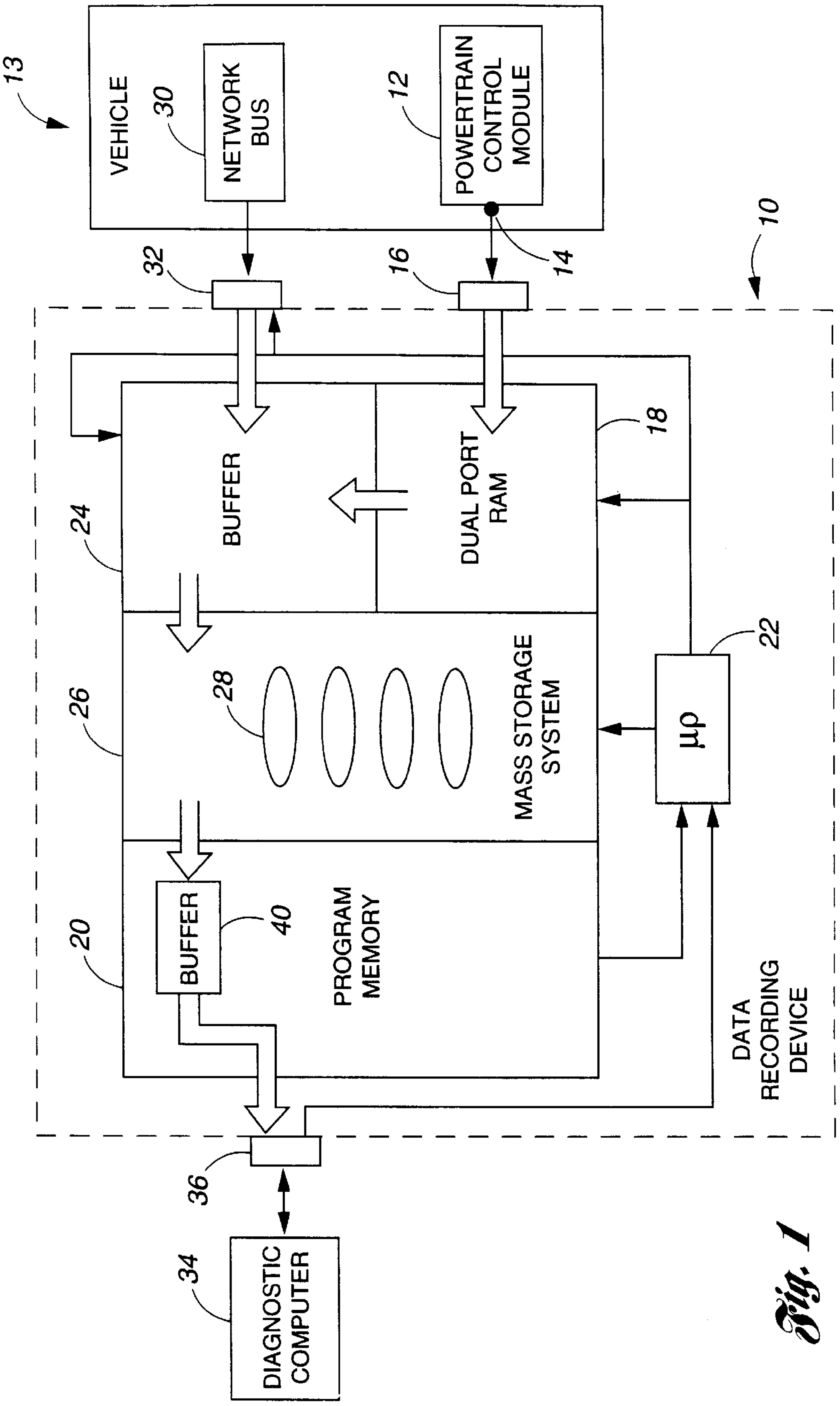
FIG. 1 is a block diagram of the monitoring device of the present invention.

Turning now to FIG. 1 there is shown a block diagram of the monitoring device of the present invention, denoted generally by reference number 10. The device 10 is adapted to interface with a powertrain control module (PCM) 12 of a vehicle 13 via a terminal 14 at an interface 16. The terminal 14 is preferably the standard "J" connector used on all production PCMs which allow access to an electronic bus in the PCM 12 so as to supply raw data internally monitored by the PCM 12. The interface 16 ensures signal integrity and provides protection against failure due to an added dual port RAM (Random Access Memory) 18 to the electronic bus of the PCM 12.

The dual port RAM 18 maps the memory, both RAM and ROM (Read Only Memory) (not shown) of the PCM 12, therefore, obtaining access to the vehicle strategy's parameters. The dual port RAM 18 is preferably a mirror image of the memory of the PCM 12 so that all data collected by the PCM 12 is also copied to the dual port RAM 18. Raw data in the form of engine parameters can then be collected on a realtime basis. The dual port RAM 18 includes two address buses and two data buses so that data can be written at the same time it is read without interrupting operation of the PCM 12. The engine parameters includes calibration variables or constants that reside in the RAM or ROM of the PCM 12, respectively, such as calculated engine RPM (Revolutions Per Minute), calculated mass airflow, engine load, etc. The engine parameters also include sampled raw sensor signals, such as mass air flow, HEGO (Heated Exhaust Gas Oxygen), etc.

The relevant engine parameters to be collected from the dual port RAM 18 are determined according to a program residing in a program memory 20. A program developed by a user of the device 10, such as a technician or engineer, identifies which addresses of RAM and ROM of the PCM 12 represent the data needed to be collected and stored for subsequent processing. The program memory 20 may either be volatile RAM, in which case power (not shown) must be constantly supplied to the device 10 in order to save the memory, or a non-volatile flash memory. The program controls the operation of a microprocessor 22 which initiates the transfer of relevant engine parameters from the dual port RAM 18 to a buffer 24.

The buffer 24 contains high speed static RAMs that store information collected from the PCM 12. Once a sufficient amount of data is stored in the buffer 24, the buffer 24 then transfers this data in a burst mode to a low cost mass storage system 26 in response to a control signal from the microprocessor 22. The mass storage system 26 is a non-volatile memory and includes a plurality of storage mediums 28, such as flash RAM, hard disk platters, magneto optical disks, or other similar storage mediums available today or yet to be invented. Such a mass storage system can store at least 10 Gigabytes of memory, far exceeding the amount available in present data recorders. Data may be collected for several hours, days or weeks, depending on the number of signals to be collected and the sampling/timestamping rate.

The device 10 may also be connectable to a non-powertrain network communication bus, such as an SCP (Standard Corporate Protocol) bus 30, at an SCP interface 32. Vehicles that incorporate such a network have their components controlled by the SCP bus 30 by transferring information between the components in an asynchronous fashion. Thus, an abundance of information is available on the network. Therefore, non-powertrain systems, such as body/chassis subsystems, are monitored by the device 10 by caching SCP messages. An alternative network that may be monitored is the CAN (Controller Area Network).

The SCP interface 32, or other network interface, consists of the electronics that will implement the network protocol, i.e., typically specialized ICs, such as HBCC (Hosted Bus Controller Chip) manufactured by Motorola. This interface connects to the physical SCP bus 30, and can be programmed by the microprocessor 22 to allow specific messages to be collected and others to be filtered out.

In order to determine which vehicle parameters are to be monitored, the program is written based on the problem to be solved or the area to be studied. For example, HEGO data may not be needed in case of an intermittent problem with the vehicle's radio. The program also determines when and how the data is to be collected. For example, some programmable features include triggering (pre-, mid-, or post-event) and type of data collection, i.e., sampled or timestamped.

Once the data has been collected, the data can then be download into a diagnostic computer 34 via a computer interface 36 for further analysis. A buffer 40 of the program memory 20 allows burst of data from the mass storage system 26 to be retrieved and sent to the diagnostic computer 34 as controlled by the microprocessor 22. The data may then be post-processed for research, diagnostics, or for general system monitoring. Alternate uses of the data include general data collection for product development and study of customer driving patterns.

One practical use of the monitoring device 10 of the present invention is for diagnosing difficult problems which prove to be intractable by the current systems. These types of problems translate into acute dissatisfaction on the part of the customer, and the loss of revenue attributed to a profoundly disgruntled customer.

While the best modes for carrying out the invention have been described in detail, those familiar with the art to which this invention relates will recognize various alternative designs and embodiments for practicing the invention as defined by the following claims.

What is claimed is:

1. An automotive data recording device for collecting data from a vehicle and for storing the data for further analysis, the device comprising:

a first electrical interface adapted to interface with a vehicle data terminal capable of supplying raw data internally collected by a vehicle computer, the vehicle computer having a memory for storing the raw data;

a volatile memory in communication with the first electrical interface for temporarily storing substantially all of the raw data stored in the vehicle computer memory;

a mass storage non-volatile memory in communication with the volatile memory for storing a desired portion of the raw data, the non-volatile memory arranged to continually save raw data collected by the vehicle computer over a long period of vehicle operation;

a microprocessor in communication with the volatile memory and the non-volatile memory and being programmed to provide a first control signal to retrieve the desired portion of the raw data from the volatile memory for storage in the non-volatile memory and to provide a second control signal to retrieve the desired portion of the raw data from the non-volatile memory: and a computer interface adapted to interface with a remote computer for generating second control signal to retrieve the desired portion of the raw data stored in the non-volatile memory so as to download the desired portion of the raw data into the remote computer.

2. The device as recited in claim 1 wherein the volatile memory is a dual port random access memory.

3. The device as recited in claim 1 wherein the non-volatile memory is a flash random access memory.

4. The device as recited in claim 1 wherein the non-volatile memory comprises a plurality of hard disks.

5. The device as recited in claim 1 wherein the non-volatile memory comprises a plurality of magneto optical disks.

6. The device as recited in claim 1 wherein the nonvolatile memory comprises at least 10 gigabytes of memory.

7. The device as recited in claim 1 wherein the remote computer is a diagnostic computer.

8. An automotive data recording device for collecting data from a vehicle and for storing the data for further analysis, the device comprising:

a first electrical interface adapted to interface with a vehicle data terminal capable of supplying raw data internally monitored by a vehicle computer, the vehicle computer having a memory for storing the raw data;

a volatile memory in communication with the first electrical interface for temporarily storing substantially all of the raw data stored in the vehicle computer memory;

a mass storage non-volatile memory in communication with the volatile memory for storing a desired portion of the raw data;

a microprocessor in communication with the volatile memory and the non-volatile memory and being programmed to provide a first control signal to retrieve the desired portion of the raw data from the volatile memory for storage in the non-volatile memory and to provide a second control signal to retrieve the desired portion of the raw data from the non-volatile memory;

a second electrical interface adapted to interface with a vehicle data network communication bus capable of supplying network messages internally transferred in the vehicle; and a second volatile memory in communication with the second electrical interface for temporarily storing desired network messages, wherein the microprocessor is further programmed to provide a third control signal for controllably filtering the network messages to select the desired network messages for storage in the second volatile memory, to provide a fourth control signal to retrieve the desired network messages from the second volatile memory for storage in the non-volatile memory, and to provide a fifth control signal to retrieve the desired network messages from the non-volatile memory.

9. The device as recited in claim 8 wherein the second electrical interface includes an integrated circuit having a programmable memory.

10. The device as recited in claim 8 wherein the second electrical interface includes an integrated circuit having a programmable memory.

11. The device as recited in claim 8 wherein the network communication bus is a Standard Corporate Protocol bus.

12. The device as recited in claim 8 wherein the network communication bus is a Controller Area Network bus.

13. The device as recited in claim 8 further comprising a computer interface adapted to interface with a remote computer for generating the second control signal to retrieve the desired portion of the memory and for generating the fifth control signal to retrieve the desired network messages from the non-volatile memory so as to download the desired portion of the raw data and the desired network messages into the remote computer.

14. The device as recited in claim 13 wherein the remote computer is a diagnostic computer.

* * * * *